United States Patent [19]

Schonenberger

[11] Patent Number: 5,036,932
[45] Date of Patent: Aug. 6, 1991

[54] DISC BRAKE CALIPER HOUSING

[75] Inventor: Eric Schonenberger, Bois Colombes, France

[73] Assignee: General Motors France, Gennevilliers, France

[21] Appl. No.: 523,805

[22] Filed: May 16, 1990

[30] Foreign Application Priority Data

Jun. 27, 1989 [GB] United Kingdom ............... 8914730

[51] Int. Cl.⁵ ............................................. F16D 55/22
[52] U.S. Cl. ............................... 188/71.1; 188/73.37; 188/370
[58] Field of Search ............ 188/250 R, 250 B, 73.1, 188/73.2, 73.35, 73.36, 73.37, 71.1, 370, 247, 248, 258, 73.31

[56] References Cited

U.S. PATENT DOCUMENTS

| 4,130,186 | 12/1978 | de Gennes | 188/250 B X |
| 4,410,070 | 10/1983 | Hagiwara et al. | 188/73.36 |
| 4,940,119 | 7/1990 | Kondo et al. | 188/73.31 |

FOREIGN PATENT DOCUMENTS 2076914B 6/1984 United Kingdom .
2143916A 2/1985 United Kingdom .

Primary Examiner—Robert J. Oberleitner
Assistant Examiner—Peter M. Poon
Attorney, Agent, or Firm—Ernest E. Helms

[57] ABSTRACT

A disc brake (10) for a motor vehicle comprising a rotor (12); inner and outer brake pads (14,16) disposed on opposite sides of the rotor and movable into braking engagement therewith; a piston (18) for urging the inner brake pad against the rotor; a support member securable to the motor vehicle; and a caliper housing (22) slidably supported on the support member, the caliper housing having a cylinder (20) positioned on one side of the rotor and containing the piston, and an arm member (26) on the other side of the rotor for urging the outer brake pad into engagment with the rotor when the piston acts on the inner brake pad, the arm member comprising a first limb (28) on the leading side of the arm member relative to a normal direction of rotation of the rotor, and a second limb (30) on the trailing side of the arm member relative to a normal direction of rotation of the rotor, each limb having a boss (32,34) protruding therefrom for engaging the outer brake pad, the boss (22) on the first limb having a smaller engaging surface area (A) than the engaging surface area (B) of the boss (34) of the second limb, and the first limb being less flexible than the second limb. Prevents or reduces tapered wear of brake pad linings.

9 Claims, 3 Drawing Sheets

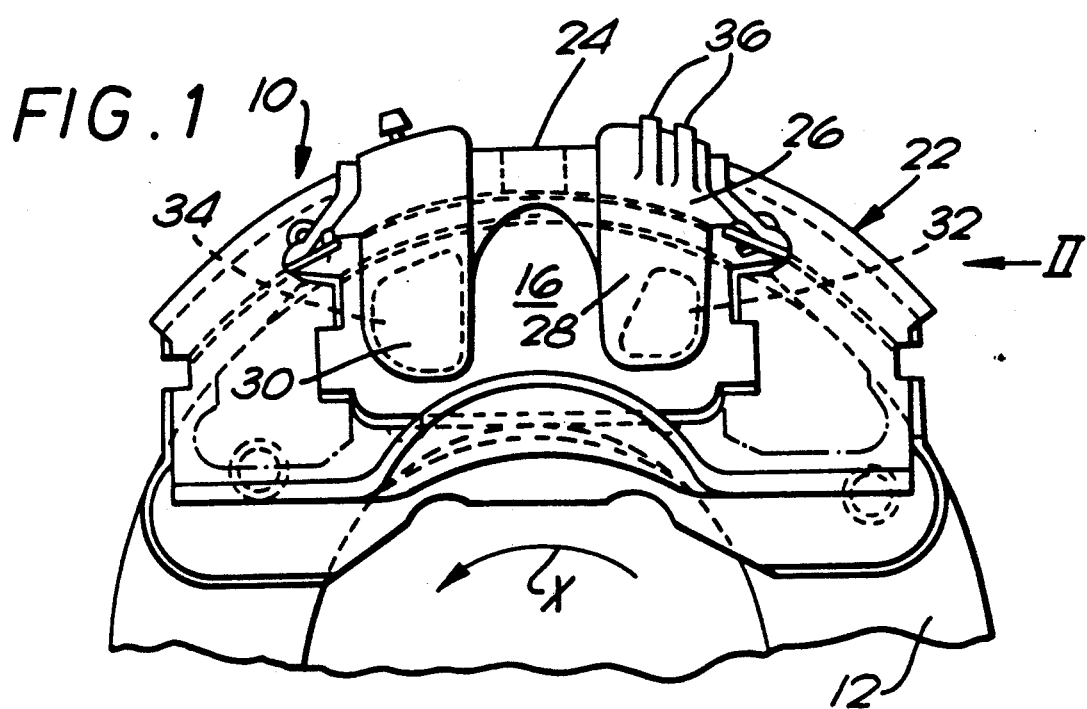
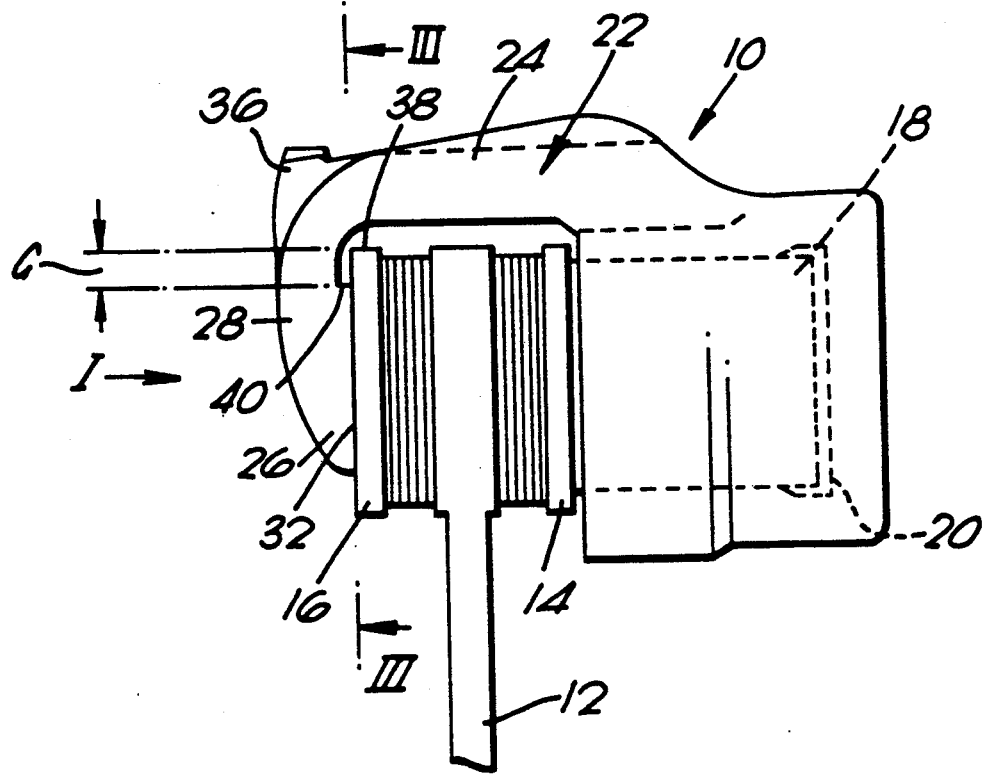

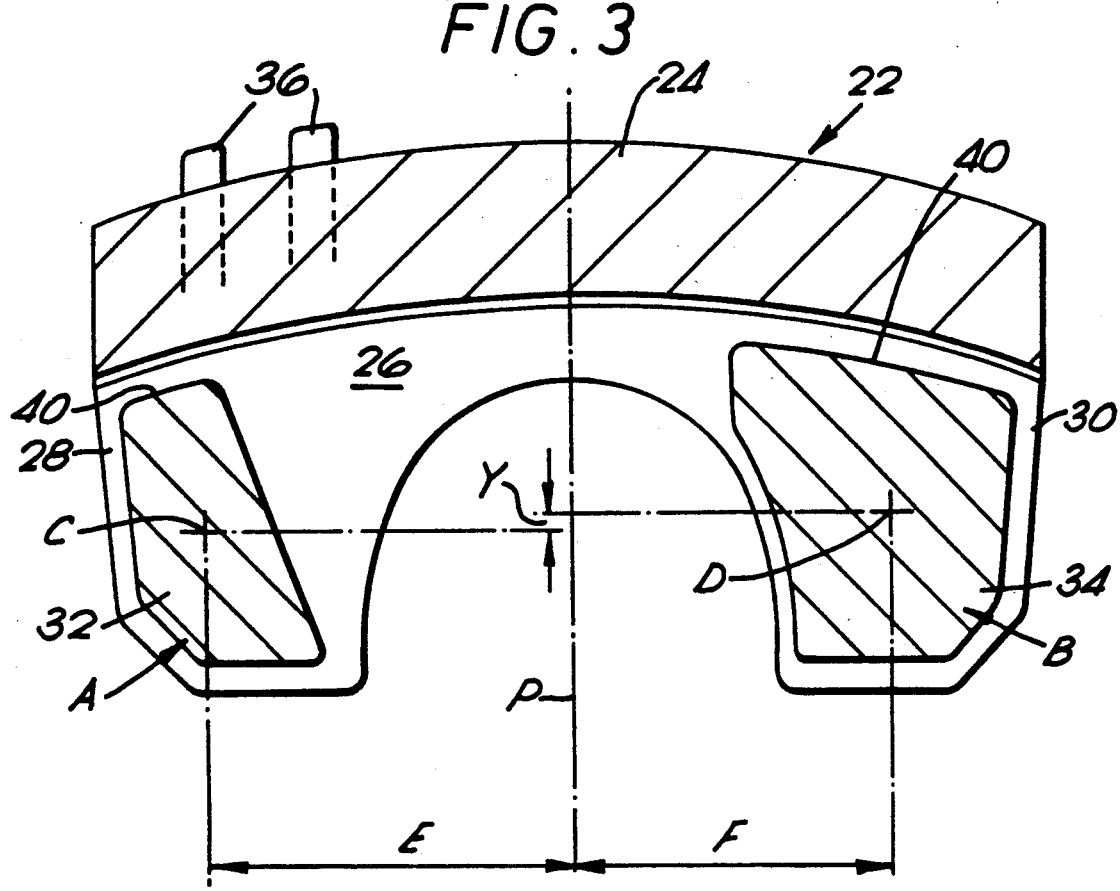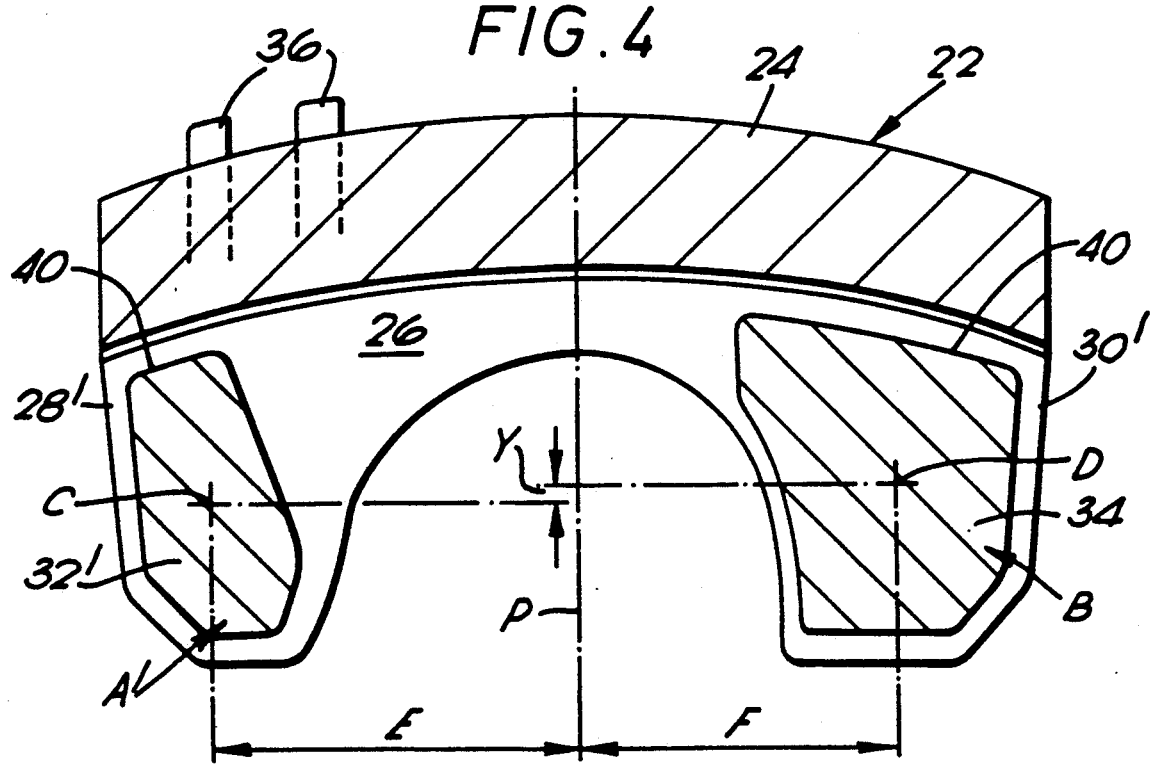

DISC BRAKE CALIPER HOUSING

This invention relates to a disc brake for a a motor vehicle, and in particular to a disc brake caliper housing for the disc brake.

It is well known on motor vehicles to provide a disc brake comprising a rotor, inner and outer brake pads, and a caliper housing having a cylinder containing a piston for urging the inner brake pad into braking engagement with the rotor and an arm member for urging the outer brake pad into braking engagement with the rotor by reactive force on actuation of the piston. The arm member usually comprises two limbs which are substantially identical and symmetrical, and which present substantially equal engaging surface areas to the outer brake pad. This type of disc brake is commonly referred to as the floating caliper type. In use, however, it has been found that such an arrangement causes uneven wear of the lining on the outer brake pad between its leading and trailing edges, and between its inner and outer radial edges. This in turn, can lead to sticking of the outer brake pad, and vibration (usually of the inner brake pad) which generates brake squeal or noise.

In order to overcome this problem, it has been proposed to provide outer brake pads in which the lining is initially tapered in thickness. However, this has not proved to be successful because of problems of manufacture, installation, cost, and a failure to overcome the above mentioned problems. A further proposal is shown in GB Patent Application No. 2076914A. In this case, the leading limb of the arm member is made more flexible than the trailing limb to provide uneven pressure across the outer brake pad in order to reduce frictional vibration. However, no mention is made in this publication of uneven wear, and the arrangement disclosed therein does not overcome this problem.

It is an object of the present invention to overcome the above mentioned problems.

To this end, a disc brake in accordance with the present invention comprises a rotor; inner and outer brake pads disposed on opposite sides of the rotor and movable into braking engagement therewith; a piston for urging the inner brake pad against the rotor; a support member securable to the motor vehicle; and a caliper housing slidably supported on the support member, the caliper housing having a cylinder positioned on one side of the rotor and containing the piston, and an arm member on the other side of the rotor for urging the outer brake pad into engagement with the rotor when the piston acts on the inner brake pad, the arm member comprising a first limb on the leading side of the arm member relative to a normal direction of rotation of the rotor, and a second limb on the trailing side of the arm member relative to a normal direction of rotation of the rotor, each limb having a boss protruding therefrom for engaging the outer brake pad, the boss on the first limb having a smaller engaging surface area than the engaging surface area of the boss of the second limb, and the first limb being less flexible than the second limb.

In use, the rotor is secured to a wheel of the motor vehicle to rotate therewith. By 'normal direction of rotation' is meant the direction of rotation of the rotor when the motor vehicle is travelling in a forward direction. By 'leading side' of the arm member is meant the side of the arm member located upstream with respect to the normal direction of rotation of the rotor. By 'trailing side' of the arm member is meant the side of the arm member located downstream with respect to the normal direction of rotation of the rotor.

Preferably, the bosses are formed integrally with the limbs.

The centers of the engaging surface areas of the bosses are preferably offset relative to one another and relative to a plane passing between, and equidistant from, the limbs.

Preferably, the center of the engaging surface area of the boss on the first limb is further away from a plane passing between, and equidistant from, the limbs, than the center of the engaging surface area of the boss on the second limb.

In the case where the bosses on the limbs have an outer radial edge, and the outer brake pad has an outer radial edge, the outer radial edge of the outer brake pad is preferably positioned radially outwards from the outer radial edge of the bosses by a predetermined distance.

Preferably, ribs are formed on the caliper housing to make the first limb less flexible than the second limb. Alternatively, the first limb may have a greater thickness than the second limb to thereby ensure the first limb is less flexible.

The first and second limbs may have differing profiles. Further, the center of the piston may be offset from the center of the inner and outer brake pads in the longitudinal direction.

The present invention will now be described, by way of example, with reference to the accompanying drawings, in which:

FIG. 1 is a partial end view of a disc brake in accordance with a preferred embodiment of the present invention taken in the direction I of FIG. 2;

FIG. 2 is a partial side view taken in the direction II of FIG. 1;

FIG. 3 is a cross-section taken on the line III—III of FIG. 2;

FIG. 4 is a modification of the arrangement shown in FIG. 3; and

Figure 5:
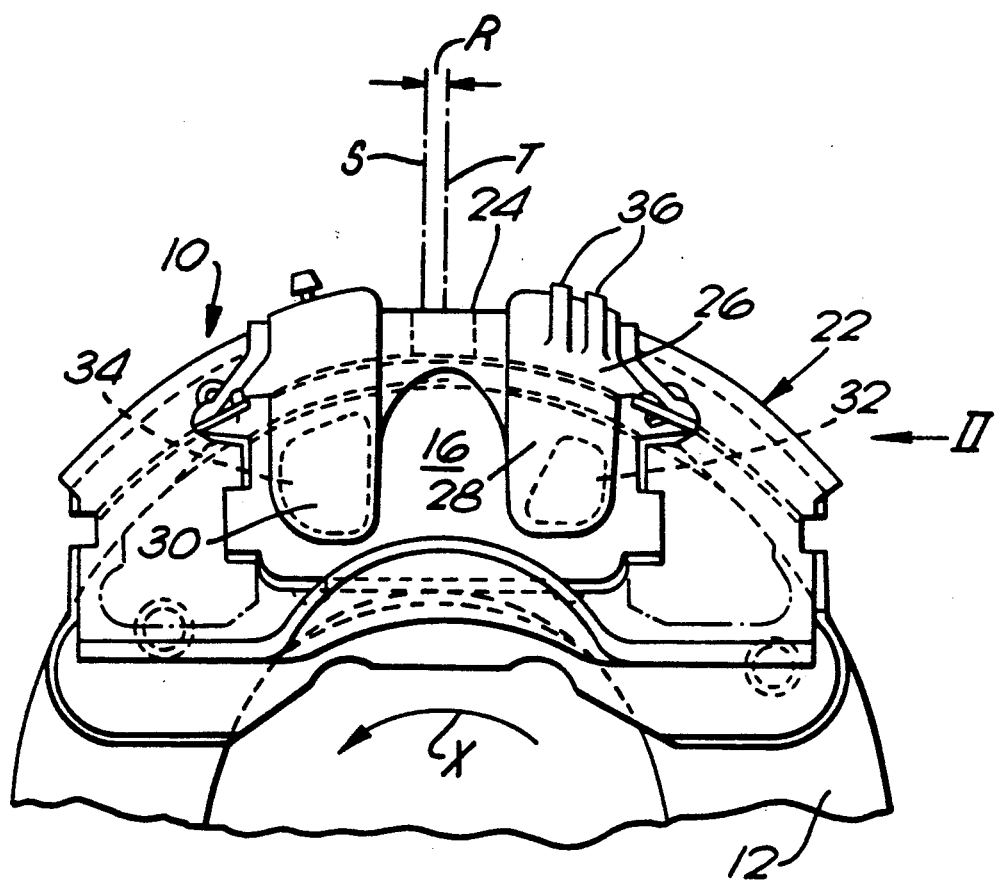
FIG. 5 is a modification of the arrangement shown in FIG. 1.

A disc brake 10 in accordance with the present invention is shown in the drawings. The disc brake 10 comprises a rotor 12 connectable to a wheel (not shown) of a motor vehicle to rotate in the direction X when the motor vehicle is travelling in a forward direction. Positioned on opposite sides of the rotor 12 are inner and outer brake pads 14, 16 respectively. A piston 18 is slidably mounted in a cylinder 20 in a caliper housing 22 adjacent the inner brake pad 14. The caliper housing 22 also includes a saddle portion 24 which straddales the rotor 12 and an arm member 26 adjacent the outer brake pad 16. The caliper housing 22 is slidable mounted on a support member (not shown) which is secured to the motor vehicle.

On actuation of the disc brake by a vehicle operator, hydraulic fluid is pressurized in the cylinder 20 to move the piston 18 towards the rotor 12. By this action, the piston 18 engages the inner brake pad 14 and urges it into braking engagement with the rotor 12. Substantially simultaneously, by reactive forces, the caliper housing 22 slides on its support member such that the arm member 26 engages the outer brake pad 16 and urges it into braking engagement with the rotor 12.

The arm member 26 is bifurcated to define two limbs 28, 30. The first limb 28 is positioned at the leading side of the arm member 26, that is, upstream with respect to the normal direction of rotation X of the rotor 12. The second limb 30 is positioned at the trailing side of the arm member 26, that is, downstream with respect to the normal direction of rotation X of the rotor 12. Each limb 28,30 has, on its side adjacent the outer brake pad 16, a boss 32,34 respectively projecting therefrom. The bosses 32,34 are preferably formed integrally with the caliper housing 22 when it is cast (the usual method of forming the caliper housing), and then machined to form engaging surface areas A,B of the required size. As shown in FIG. 3, the boss 32 on the first limb 28 has a smaller surface area A for contacting the outer brake pad 16 than the surface area B of the boss 34 on the second limb 30. Further, the first limb 28 has ribs 36 associated therewith which ensure that the first limb is less flexible (more rigid) than the second limb 30.

The smaller surface area A results in the leading (upstream) side of the outer brake pad 16 being subjected to a greater pressure than the trailing (downstream) side when the vehicle operator actuates the disc brake 10. The ribs 36 act to stiffen the first limb 28 in comparison to the second limb 30, thereby providing a means by which the first limb deflects at a lower position than the second limb to provide for even wear of the brake pad linings.

Ignoring the ribs 36 and bosses 32,34, the arm member 26 is substantially symmetrical about a plane P (FIG. 3) passing between, and equidistant from, the first and second limbs 28,30. Taking line from the centers C,D of each surface area A,B respectively substantially perpendicular to plane P, the preferred arrangement is such that the centers C,D are offset (distance Y) relative to one another, and the center C is further away (distance E) from the plane P than the center D (distance F). Further, the use of bosses 32,34 provides a predetermined distance G (FIG. 2) between the outer radial edge 38 of the outer brake pad 16 and the outer radial edge 40 of the bosses, with the outer radial edge 38 of the outer brake pad 16 being positioned radially outwards of the outer radial edge 40 of the bosses 32,34.

With this arrangement, it is possible to influence and control the movement of the outer brake pad 16 relative to the rotor 12, and to influence and control the pressure and force distribution from the caliper housing 22 to the outer brake pad 16. This can be used to reduce the tapered wear of the brake pad linings in both the longitudinal and radial directions by adjusting the pressure pattern provided by the caliper housing 22; to created an uneven movement of the outer brake pad 16 relative to the rotor 12 to clean the interface between the outer brake pad 16 and the caliper housing 22 on brake application to avoid seizing or sticking of the outer brake pad by dirt or corrosion; and to reduce brake squeal or noise by limiting vibration of the inner and outer brake pads 14,16. The difference in the surface areas A,B, and the difference in the stiffness between the two limbs 28,30 affect the lining wear in both the longitudinal and radial directions. This is enhanced by the centers C,D being offset by distances Y,E, and F. The distance G further helps to control lining wear in the radial direction.

In the modification shown in FIG. 4, the profile of the first limb 28' is different from that of the second limb 30'. As a consequence, the engaging surface area A' of the boss 32' is different from that shown in FIG. 3. All the other features shown in FIG. 3 remain unchanged in the FIG. 4 embodiment. This modification again ensures even wear of the brake pad linings.

In the further modification shown in FIG. 5, the piston, and the inner and outer brake pads are offset from one another. This is highlighted by a line S which extends radially and which passes through the center of the piston, and a line T which extends radially and which passes through the center of the inner and outer brake pads. As can be seen in FIG. 5, lines S and T are longitudinally offset from one another by a distance R. This arrangement helps to reduce longitudinal tapered wear of the brake pad linings.

The actual sizes of the surface areas A,A', B, and the distances Y,E,F,G,R can be calculated to suit the particular application of the disc brake 10, and the caliper housing 22 is manufactured accordingly.

I claim:

1. A disc brake for a motor vehicle comprising a rotor; inner and outer brake pads disposed on opposite sides of the rotor and movable into braking engagement therewith; a piston for urging the inner brake pad against the rotor; a support member securable to the motor vehicle; and a caliper housing slidably supported on the support member, the caliper housing having a cylinder positioned on one side of the rotor and containing the piston, and an arm member on the other side of the rotor for urging the outer brake pad into engagement with the rotor when the piston acts on the inner brake pad, the arm member comprising a first limb on the leading side of the arm member relative to a normal direction of rotation of the rotor, and a second limb on the trailing side of the arm member relative to a normal direction of rotation of the rotor, each limb having a boss protuding therefrom for engaging the outer brake pad, the boss on the first limb having a smaller engaging surface area than the engaging surface area of the boss of the second limb, and the first limb having means for making said first limb less flexible than the second limb.

2. A disc brake as claimed in claim 1, wherein the bosses are formed integrally with the limbs.

3. A disc brake as claimed in claim 1, wherein the centers of the engaging surface areas of the bosses are offset relative to one another, and relative to a plane passing between, and equidistant from, the limbs.

4. A disc brake as claimed in claim 1, wherein the center of the engaging surface area of the boss on the first limb is further away from a plane passing between, and equidistant from, the limbs, than the center of the engaging surface area of the boss on the second limb.

5. A disc brake as claimed in claim 1, in which the bosses on the limbs have an outer radial edge, and the outer brake pad has an outer radial edge, wherein the outer radial edge of the outer brake pad is positioned radially outwards from the outer radial edge of the bosses by a predetermined distance.

6. A disc brake as claimed in claim 1, wherein said first limb means comprise ribs which are formed on the caliper housing to make the first limb less flexible than the second limb.

7. A disc brake as claimed in claim 1, wherein the first and second limbs have differing profiles.

8. A disc brake as claimed in claim 1, wherein the center of the piston is offset from the centers of the inner and outer brake pads in a longitudinal direction.

9. A disc brake caliper housing for a motor vehicle including a rotor, inner and outer brake pads disposed on opposite sides of the rotor and movable into braking engagement therewith, a piston for urging the inner brake pad against the rotor, a support member securable to the motor vehicle; said support member slidably supporting the caliper housing, the caliper housing comprising: a cylinder positioned on one side of the rotor and containing the piston; an arm member on the other side of the rotor for urging the outer brake pad into engagement with the rotor when the piston acts on the inner brake pad; the arm member including a first limb on the leading side of the arm member relative to a normal direction of rotation of the rotor, and a second limb on the trailing side of the arm member relative to a normal direction of rotation of the rotor, each limb having a boss protuding therefrom for engaging the outer brake pad, the boss on the first limb having a smaller engaging surface area than the engaging surface area of the boss of the second limb, and the first limb having means for making said first limb less flexible than the second limb.

* * * * *